Dec. 9, 1941.     W. M. LAYTON     2,265,295
RECTANGULAR ELECTRIC ROASTER
Original Filed Oct. 9, 1936

WITNESSES:
E. A. McCloskey
Wm. C. Groome

INVENTOR
William M. Layton.
BY
W. R. Coley
ATTORNEY

Patented Dec. 9, 1941

2,265,295

UNITED STATES PATENT OFFICE 2,265,295

RECTANGULAR ELECTRIC ROASTER

William M. Layton, Mansfield, Ohio, assignor to Westinghouse Electric & Manufacturing Company, East Pittsburgh, Pa., a corporation of Pennsylvania Application October 9, 1936, Serial No. 104,839
Renewed November 22, 1938

17 Claims. (Cl. 219—44)

My invention relates to cooking devices and more particularly to an electrically heated rectangular roaster.

As is well known in the prior art, a round or oval type roaster may have a heating coil around its body so that it makes good thermal contact at all points along the surface. However, in the case of a rectangular roaster with flat sides or walls, in wrapping the heating element wire around the corners, there is encountered the well-known spring effect of the wire which prevents the element wire from being drawn tightly up against the side walls of the roaster. This condition prevents a good thermal contact along the entire length of the walls of the roaster. It is, therefore, an object of my invention to provide a generally polygonal, preferably rectangular roasting pan with sides shaped so that as a heating coil is drawn tightly about the roaster the wires of the heating element will make and maintain good thermal contact at all points along the surface.

It is a further object of my invention to provide a roaster which can be inexpensively produced and will be sturdy and not easily injured.

It is a further object of my invention to so secure the heating wire in place in association with the roaster that it will not readily become displaced during use and that it may be applied inexpensively during the manufacture of the roaster.

It is another object of my invention to so provide a heating coil around a roasting pan that the wire may be drawn tight without danger of damage to it or to the pan and without danger of cutting the insulation by drawing the wire too tight or of permitting the wire to sag by not being tight enough.

Figure 1:
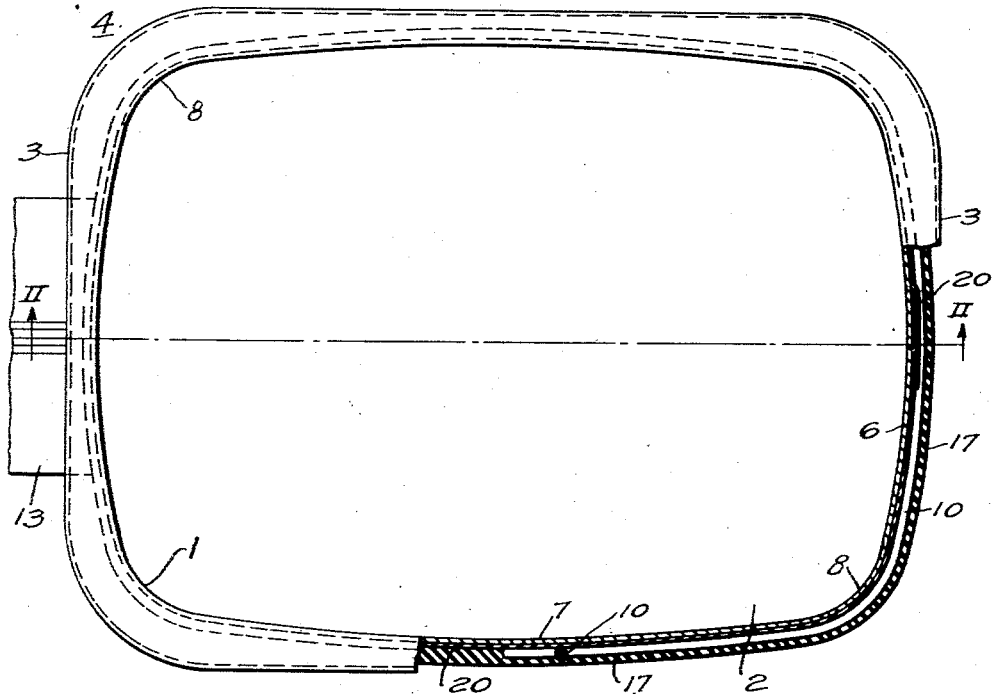
Figure 2:
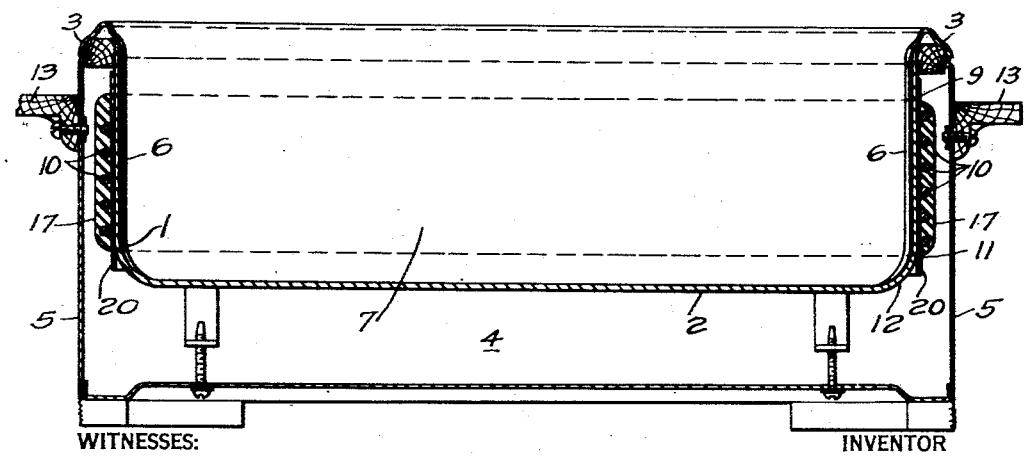

Other objects of the invention and details of the proposed structure will be apparent from the following description and the accompanying drawing, in which Figure 1 is a top plan view and partial sectional view of the device embodying my invention, and Fig. 2 is a sectional view taken on the line II—II of Fig. 1.

The illustrated roaster 4 comprises a pan 1, generally rectangular in shape, and having a bottom 2 and upstanding walls which are turned over at the top to form a flange 3. The upstanding walls of the pan comprise end portions 6 and side portions 7. I desire it to be understood, however, that polygonal forms of a pan or the like, other than rectangular, may employ my invention to advantage.

The upstanding walls 5, comprising the outer casing of roaster 4, and the upstanding walls 6 and 7 of pan 1 are vertical, as illustrated in Fig. 2. However, walls 5 of the outer casing are flat throughout the length thereof, whereas, the walls 6 and 7 of the pan 1 are bowed outwardly. Handles 13 are attached to the end walls 5 of the outer casing in any suitable manner and are used for lifting the roaster and its contents.

The pan 1 is made of metal, preferably vitreous enameled, and the turned-over flange 3 is of the same material. The end portions 6 are bulged or bowed outwardly and the side portions 7 are bulged on a somewhat larger radius as illustrated in Fig. 1, the radii of curvature of both the end and side portions being greater than any dimension of the pan. Preferably no part either of the ends or of the sides is flat. The ends and the sides join in corners, as shown at 8, which may be of considerable radius. In the illustration chosen, the radius of the corner is about one-fifth of the width of the pan. While no specific limit need be stated, it is preferred that the corners be far enough from sharp to prevent injury to the wire or the insulation while the heating coil is being wound thereon.

A sheet of asbestos 20 is first wound around the pan 1 and in contact with the outer walls of the bulging sides and ends thereof. Bare resistance wire 10, preferably of nickel-chromium alloy, is then tightly wound around the pan on top of the asbestos paper 20 which is used as an insulator. During this winding, the wire is drawn tight enough to prevent it from sagging, which result is readily effected by reason of the bulged walls. Nevertheless, since the bulged sides and ends of the pan meet at rounded corners without any sharp edge between them, the wire is not injured while being drawn against them nor does it cut through the asbestos paper 20.

After the coil is in place, it may be coated with an electrical insulating cement 17 which, in addition to the tightness of the winding, holds the wire in place on the pan and gives a better thermal contact with the sides of the roaster. The cement adheres not only to the asbestos sheet but also to the wire and thus secures it permanently in place.

The coil does not extend completely to the bottom of the pan but stops at a boundary 11 which is shown as at the beginning of the rounded edge 12 joining the sides with the bottom. The coil need not extend all the way down to the beginning of the rounded edge. It is also stopped short of the flange 3, being shown as stopping at a point 9 slightly below where the pan begins to bend over to make the flange.

The partial sectional view of Fig. 1, taken through one of the resistance wires, and Fig. 2 illustrates the relative position of the various elements from the pan 1 through to insulating cement 17. Starting with the end wall 6 of the pan 1, the sheet of asbestos 20 is in contact therewith, and the bare resistance wires 10 are wound around the asbestos. Insulating cement 17 is shown as being in contact both with the resistance wires 10 and the asbestos sheet 20. It will be observed that the cement 17 completely encircles the wires 10, except that portion which is in contact with the asbestos sheet. The cement, due to its contact with the asbestos and the heating element, causes a better thermal contact with the sides of the roaster.

Variations of my invention will occur to those skilled in the art without specific mention of them here. The specific illustration and mention of the form described is not to be considered a limitation, no limitations being intended except those expressly stated in the appended claims.

I claim as my invention:

1. An electric heating device including a pan generally polygonal in shape and having a bottom and upstanding walls having every part thereof convexed outwardly, and a winding around said pan secured to said upstanding walls.

2. An electric heating device including a pan substantially rectangular in shape, having a bottom and upstanding walls having every part thereof convexed outwardly and a winding around said pan secured to said upstanding walls.

3. An electric heating device including a pan substantially rectangular in shape, having a bottom and upstanding walls having every part thereof convexed outwardly, insulating material around said pan, and a winding around the pan upon the insulating material secured to the insulating material and to the upstanding walls.

4. An electric heating device including a metallic pan substantially polygonal in shape, having a bottom and upstanding walls, a winding insulatedly wound around said pan secured to said upstanding walls and the walls having every part thereof convexed outwardly.

5. An electric heating device including a pan substantially rectangular in shape, none of the corners of which have a radius smaller than one-fifth the width thereof, a winding on said pan secured to the sides thereof and insulated therefrom.

6. An electric heating device including a pan substantially rectangular in shape and having a bottom and upstanding end and side walls, curved corners joining said walls and having radii not less than one-fifth the width of the pan, the end and side walls being bulged outwardly on radii greater than any dimension of the pan, a winding on said pan secured to the sides thereof and insulated therefrom.

7. An electric heating device including a metallic pan substantially polygonal in shape, having a bottom and upstanding end and side walls with curved corners joining said walls, said walls having every part thereof convexed outwardly, and a winding around said pan insulatedly secured to said upstanding walls.

8. An electric heating device including a pan substantially rectangular in shape and having a bottom and upstanding end and side walls, curved corners joining said walls and having radii not less than one-fifth the width of the pan, the end and side walls being bulged outwardly on radii greater than any dimension of the pan, a heating coil of resistance wire wound around said pan upon the side and end walls thereof, and material covering the heating coils and securing them to the pan.

9. An electric heating device including a metallic pan substantially polygonal in shape, having a bottom and upstanding end and side walls, curved corners joining said walls and having radii not less than one-fifth the width of the pan, the end and side walls being bulged outwardly on radii greater than any dimension of the pan, a heating coil of resistance wire insulatedly wound around said pan upon the side and end walls thereof, and insulating material covering the heating coils and securing them to the pan.

10. An electric heating device including a metallic pan substantially rectangular in shape, having a bottom and upstanding end and side walls, curved corners joining said walls, the end and side walls being bulged outwardly on radii greater than any dimension of the pan, a heating coil of resistance wire insulatedly wound around said pan upon the side and end walls thereof, and insulating cement covering the heating coils and securing them to the pan.

11. An electric heating device comprising a double metallic structure generally polygonal in shape and having flat outer upstanding walls and inner upstanding walls having every part thereof convexed outwardly, and a winding around and upon the inner walls of said structure and secured thereto.

12. An electric heating device comprising a double metallic pan substantially polygonal in shape, having a double bottom, flat outer upstanding walls and inner upstanding walls having every part thereof convexed outwardly, and a winding insulatedly wound around and upon the inner walls of said pan and secured thereto.

13. An electric heating device comprising a double metallic pan substantially rectangular in shape, having a double bottom, flat outer upstanding walls and inner upstanding walls having every part thereof convexed outwardly, insulating material around and upon the inner walls of said pan, and a winding around the inner walls upon the insulating material and secured thereto and to the upstanding walls.

14. An electric heating device comprising a double metallic pan substantially rectangular in shape, having a double bottom, flat outer upstanding walls and inner upstanding walls with curved corners joining the inner walls, said inner walls having every part thereof convexed outwardly, and a winding insulatedly wound around and upon the inner walls of said pan and secured thereto.

15. An electric heating device comprising a double metallic pan substantially rectangular in shape, having a double bottom, flat outer upstanding walls and inner upstanding walls with curved corners joining the inner walls, said inner walls having every part thereof convexed outwardly on radii greater than any dimension of the pan, a heating coil of resistance wire insulatedly wound around and upon the inner walls of said pan, and insulating cement covering the heating coils and securing them to the inner walls.

16. An electric roaster comprising a pan substantially rectangular in shape and having a bottom wall and upstanding side and end walls, and a resistance wire wound around said pan upon the upstanding walls thereof, said side walls having the major portions thereof convexed outwardly and being formed so that said resistance wire bears substantially throughout its length against said upstanding walls and so that substantially every part thereof adjacent a side wall is drawn tightly against the same, by reason of said side wall portions being convexed outwardly, to provide good thermal contact.

17. An electric heating device comprising a liner or casing including a first rectangular wall, four rectangular walls extending perpendicularly from the four sides of the first rectangular wall, and curved portions connecting adjacent perpendicular walls; and a resistance wire wound around said casing upon said perpendicular walls and said curved corner portions; said perpendicular walls having the major portions thereof convexed outwardly and being formed so that said resistance wire substantially throughout its length bears against said perpendicular walls and curved portions and so that substantially every part thereof adjacent a perpendicular wall is drawn tightly against the same, by reason of said perpendicular walls being convexed outwardly, to provide good thermal contact.

WILLIAM M. LAYTON.